(12) United States Patent
Sieg et al.

(10) Patent No.: US 12,030,442 B2
(45) Date of Patent: Jul. 9, 2024

(54) DOOR HANDLE ELECTRONICS UNIT HAVING TWO COMMUNICATION MEANS

(71) Applicant: Huf Hülsbeck & Fürst GmbH & Co. KG, Velbert (DE)

(72) Inventors: Berthold Sieg, Bottrop (DE); Alexander Ziegler, Wülfrath (DE)

(73) Assignee: Huf Hülsbeck & Fürst GmbH & Co. KG, Velbert (DE)

(*) Notice: Subject to any disclaimer, the term of this patent is extended or adjusted under 35 U.S.C. 154(b) by 376 days.

(21) Appl. No.: 17/604,554

(22) PCT Filed: Jun. 3, 2020

(86) PCT No.: PCT/EP2020/065301
§ 371 (c)(1),
(2) Date: Oct. 18, 2021

(87) PCT Pub. No.: WO2020/249437
PCT Pub. Date: Dec. 17, 2020

(65) Prior Publication Data
US 2022/0176897 A1 Jun. 9, 2022

(30) Foreign Application Priority Data

Jun. 11, 2019 (DE) .................. 10 2019 115 716.1
Sep. 10, 2019 (DE) .................. 10 2019 124 217.7

(51) Int. Cl.
*H01Q 1/32* (2006.01)
*B60R 16/023* (2006.01)
(Continued)

(52) U.S. Cl.
CPC ......... *B60R 16/023* (2013.01); *H01Q 1/3283* (2013.01); *H01Q 7/00* (2013.01);
(Continued)

(58) Field of Classification Search
CPC . B60R 16/023; B60R 2325/103; B60R 25/01; B60R 25/20; E05B 81/77;
(Continued)

(56) References Cited

U.S. PATENT DOCUMENTS 10,843,535 B1 * 11/2020 Mazuir ............... G02F 1/13725
2005/0156468 A1 * 7/2005 Hentsch .................. E05B 81/77
307/10.1
(Continued)

FOREIGN PATENT DOCUMENTS

DE 102014113832 A1 3/2016
DE 102016219748 A1 4/2018
DE 102017123065 A1 5/2018

OTHER PUBLICATIONS

Communication according to Article 94 (3) EPC for European Application No. 20 733 205.7, Issued by the European Patent Office, Mailed on May 19, 2023, 4 pages.
(Continued)

*Primary Examiner* — Tan H Trinh
(74) *Attorney, Agent, or Firm* — Peter W. Schroen; Bret E. Field; Bozicevic, Field & Francis LLP

(57) ABSTRACT

The invention relates to an arrangement (10) for providing at least one communication function for electronics (2) of a vehicle (1), preferably for a door handle electronics (2) of the vehicle (1), preferably for a communication interface (40) of the vehicle (1), exhibiting
 a support element (20) adapted to be mounted at mounting positions (I, II) on different sides of the vehicle (1) to selectively perform the mounting at at least a first (I) or second (II) of the mounting positions (I, II),
 a first communication means (41) arranged at a first layer (21) of the support element (20),
(Continued)

Figure 1:
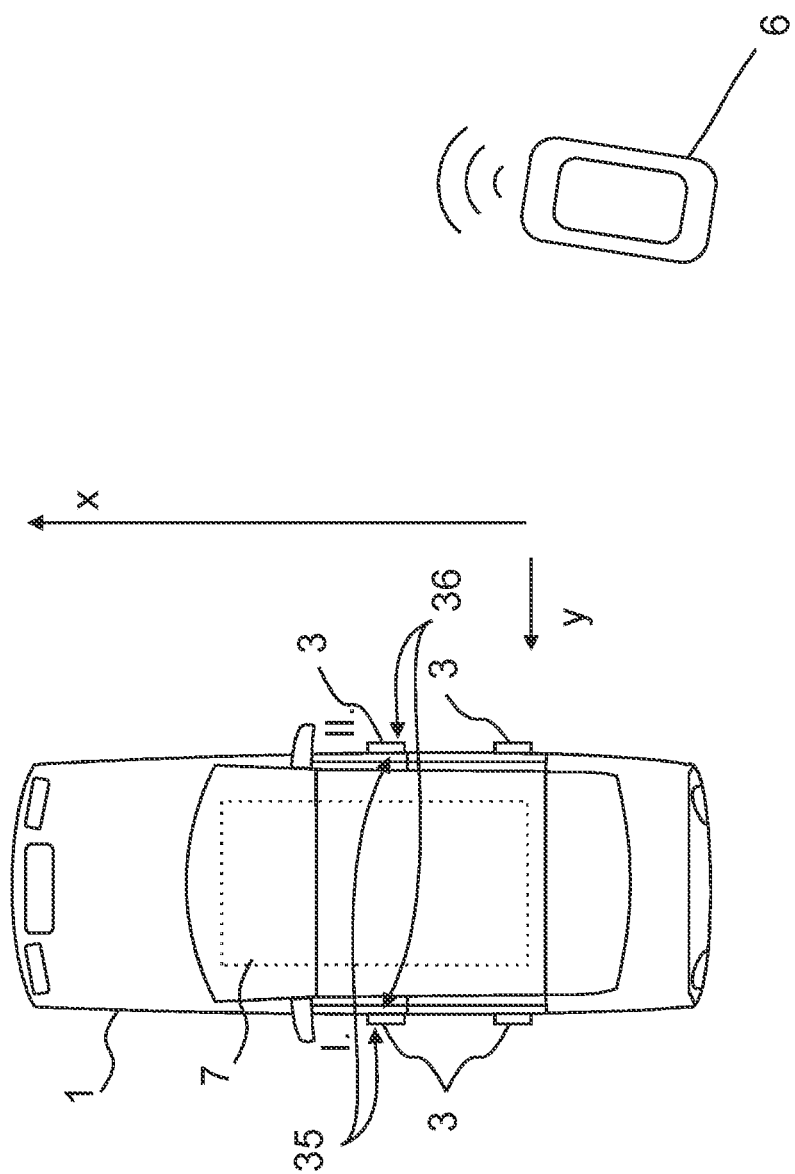

a second communication means (42) arranged at a second layer (22) of the support element (20),
said communication means (41, 42) being arranged opposite to each other and electrically connected in parallel to create at least one communication area suitable for different selected mounting positions (I, II).

16 Claims, 9 Drawing Sheets

(51) Int. Cl.
    *H01Q 7/00*     (2006.01)
    *B60R 25/01*     (2013.01)
    *B60R 25/20*     (2013.01)
    *E05B 81/76*     (2014.01)
    *E05B 81/78*     (2014.01)
    *E05F 15/76*     (2015.01)

(52) U.S. Cl.
    CPC ............... *B60R 25/01* (2013.01); *B60R 25/20* (2013.01); *B60R 2325/103* (2013.01); *E05B 81/77* (2013.01); *E05B 81/78* (2013.01); *E05F 15/76* (2015.01); *E05Y 2400/44* (2013.01); *E05Y 2900/531* (2013.01)

(58) Field of Classification Search
    CPC ...... E05B 81/78; E05F 15/76; E05Y 2400/44; E05Y 2900/531; H01Q 1/3241; H01Q 1/3283; H01Q 7/00
    USPC .......................................................... 455/41.1
    See application file for complete search history.

(56) References Cited

U.S. PATENT DOCUMENTS

| | | | |
|---|---|---|---|
| 2011/0112969 A1* | 5/2011 | Zaid | ........................ G06F 21/35 701/2 |
| 2013/0244577 A1 | 9/2013 | Cheikh | |
| 2014/0270306 A1* | 9/2014 | Luna | ........................ G01S 11/06 381/334 |
| 2015/0221146 A1* | 8/2015 | Leda | ........................ G07C 9/20 340/5.72 |
| 2018/0178753 A1* | 6/2018 | Ette | ........................ H04B 17/104 |
| 2019/0169888 A1* | 6/2019 | Gabriel | .................... E05B 79/02 |
| 2019/0386514 A1* | 12/2019 | Gerardiere | ........... H03K 17/955 |
| 2020/0095799 A1* | 3/2020 | Gerardiere | .............. B60R 16/03 |
| 2022/0043101 A1* | 2/2022 | Sanji | ........................ G01S 5/012 |
| 2022/0216869 A1* | 7/2022 | Sieg | ..................... H03K 17/962 |

OTHER PUBLICATIONS

First Office Action for Chinese Application No. 202080027739.5 mailed Oct. 27, 2022, with its English translation, 19 pages.

\* cited by examiner

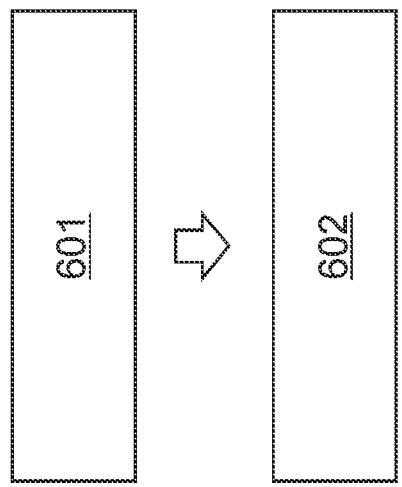
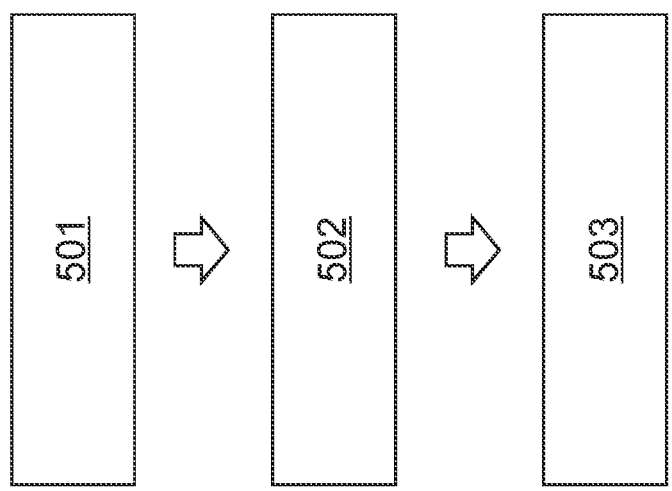
Fig. 9

DOOR HANDLE ELECTRONICS UNIT HAVING TWO COMMUNICATION MEANS

The present invention relates to an arrangement for providing at least one function for electronics of a vehicle. Furthermore, the invention relates to a method for providing at least one function for electronics of a vehicle.

In vehicles, a plurality of different electronic components are used, for example, to detect an approach and/or gesture in an surrounding of the vehicle, or to perform a communication with a mobile device such as an ID transmitter. It is known from the prior art that multilayer printed circuit boards are used for such electronics in vehicles, for example to increase the packing density, and/or to reduce the installation space required for the electronics. In this case, for example, a processing arrangement together with at least one sensor and/or an antenna can be arranged on the same printed circuit board and distributed on several layers of this printed circuit board.

A disadvantage of the known solutions is that adapted electronics must be provided for different mounting positions on the vehicle in each case, which can/could increase the effort and costs for the production of these electronics. For example, it may be necessary to provide the detection and/or the communication on the left and right side in the area of a left or right side door handle of the vehicle. The detection and/or communication field generated for this purpose may be symmetrical, e.g. directed away from the vehicle in each case. This increases the requirements and thus the manufacturing effort.

It is therefore an object of the present invention to at least partially overcome the disadvantages described above. In particular, it is an object of the present invention to propose an improved solution for such electronics.

The foregoing object is solved by an arrangement having the features of the independent device claim and by a method having the features of the independent method claim. Further features and details of the invention result from the respective dependent claims, the description and the drawings. Features and details described in connection with the arrangement according to the invention naturally also apply in connection with the method according to the invention, and vice versa in each case, so that reference is or can always be made mutually with regard to the disclosure of the individual aspects of the invention.

The object is solved in particular by an arrangement, preferably an (electronic) circuit arrangement, for providing at least one function for electronics of a vehicle, preferably for door handle electronics of the vehicle, preferably for a capacitive sensor for detecting an activation action in the vehicle, and/or for a communication interface of the vehicle, in particular for communication with a mobile device such as a mobile radio device or an electronic key, which are each used as an ID transmitter (identification transmitter). The function provided may be, for example, a detection function and/or a further function, such as a shielding function, and/or a communication function.

Advantageously, the vehicle is configured as a motor vehicle, in particular as a hybrid vehicle or as an electric vehicle, preferably with a high-voltage electrical system and/or an electric motor. Furthermore, it may be possible that the vehicle is configured as a fuel cell vehicle and/or a passenger vehicle and/or a semi-autonomous or autonomous vehicle. Advantageously, the vehicle comprises a security system which enables authentication, for example by communication with an identification transmitter (ID transmitter). This communication may be provided by the communication function. The ID transmitter may be provided by a dedicated electronic key or also by another mobile device such as a smartphone. Depending on the communication and/or authentication, at least one activation function of the vehicle may be activated. If the authentication of the ID transmitter is necessary for this purpose, the activation function may be a safety-related activation function, such as an unlocking of the vehicle or an enabling of an engine start. Thus, the security system can also be configured as a passive access system which initiates the authentication and/or the activation of the activation function upon detection of the approach of the ID transmitter to the vehicle without active manual actuation of the ID transmitter. For this purpose, for example, a wake-up signal is repeatedly transmitted by the security system, which can be received by the ID transmitter upon approach, and then triggers the authentication.

Also, the activation function may concern an activation of a vehicle lighting and/or an actuation (opening and/or closing) of a flap (e.g. front or rear or side flap or door). For example, automatically upon detection of an activation action such as an approach and/or gesture, the vehicle lighting is activated and/or upon detection of the activation action, the flap is actuated. In this regard, the detection of an activation action such as the approach of the user and/or the gesture may be enabled by the detection function, in particular by a capacitive sensor.

It may be possible that the detection function is provided at a vehicle component such as a door handle, preferably the outer door handle of the vehicle. By means of the detection function, for example, the approach and/or contact to the vehicle component or the door handle may be detected as an activation action. In response to the detection, an activation function may initiate, for example, an unlocking and/or an opening movement of a flap, wherein the flap may comprise the door handle or may be associated with the door handle. The flap may be a door such as a side door and/or sliding door of the vehicle.

Further, it is possible that the communication function provides the communication to, for example, exchange information with the mobile device. The information exchange relates in particular to the exchange of information for authenticating the mobile device to the vehicle. Thus, successful authentication by means of the communication may be a prerequisite for the detection by means of the detection function to trigger the activation function.

It is possible that by means of the detection function a detection is performed in a detection area in the surrounding of the vehicle. Alternatively or additionally, the communication function may provide communication in a communication area in the surrounding of the vehicle. The detection area and/or communication area may always be arranged similarly in relation to the vehicle component or door handle, regardless of whether the vehicle component or door handle is arranged on the left or right side of the vehicle. In other words, the detection and/or communication function and/or also at least one further function may be provided in the same way for different mounting positions on the left-hand side and right-hand side of the vehicle. In this case, the detection area and/or the communication area may, for example, always be arranged externally, i.e. facing away from an interior of the vehicle. Other configurations are also conceivable, in which the detection area and/or the communication area is arranged, for example, on the inside, for example in a door handle recess. Thus, the arrangement of the detection and/or communication area can define the location at which the activation action leads to activation of the activation function and/or communication can take place.

An arrangement according to the invention may comprise a support element suitable for mounting at mounting positions on different sides and/or positions of the vehicle, in order to selectively (i.e. according to a selection of the mounting position) perform the mounting at least at a first or second one of the mounting positions. In other words, the same support element and possibly even the same arrangement according to the invention can be mounted at both the first and the second mounting positions (not simultaneously, of course, but selectively). In this way, the manufacturing effort can be reduced, since the support element is nevertheless configured identically for the different mounting positions. The support element can thereby be configured separately from a processing arrangement, in order to be able to use the support element unchanged for the different mounting positions even if the processing arrangement should require adaptation to the mounting positions. Thus, unlike conventional arrangements, not all of the electronics are on a single (possibly multi-layered) support element, but a separation can be made into a part that remains the same for the mounting positions and a part that varies. However, even if the processing arrangement does not vary, i.e. needs to be adapted to the mounting positions, there may be an advantage from the separation as it allows a more flexible arrangement. In order to electrically connect the support element to the processing arrangement, they may be connected to each other by, for example, a supply line.

An arrangement according to the invention may further comprise:
a first electrically conductive functional element at a first layer of the support element, and
a second electrically conductive functional element at a second layer of the support element.

In particular, it is envisaged that the functional elements are arranged one above the other and are configured to be at least partially congruent (and/or, if necessary, also actually at least partially overlap geometrically), in order to provide, variably assigned, a detection function for one of the layers and a further function, in particular a shielding function, for the other of the layers. In other words, the functional elements can each be suitable for providing both the detection function and the further function, and for providing the function depending on which assignment has been made for the layers.

Furthermore, an arrangement according to the invention may comprise the following, in particular as an alternative or in addition to the electrically conductive functional elements providing the detection function and the further function:
a first communication means arranged on a or the first layer of the support element,
a second communication means arranged on a or the second layer of the support element,
wherein preferably the communication means are arranged opposite to each other and/or electrically connected in parallel to create at least one (in particular one each) communication area which is suitable for different selected mounting positions.

This has the advantage that the communication function provided by the communication means can be improved by the electrical parallel connection of the communication means. For example, the communication means can each be understood as a coil, the quality of which is improved by the parallel connection. Specifically, copper losses or the internal resistance of the coils can be reduced in this way to improve the performance and/or the coil quality for generating the communication section. At the same time, the arrangement of the communication means on different layers results in the advantage that the communication area can be used for different selected mounting positions without having to change the orientation or formation of the support element. Accordingly, the levels may each be associated with a particular mounting position in order to provide the communication area specifically for the mounting position in each case. For example, in a mounting position provided on the left side of the vehicle, the communication area may extend to the left facing away from the vehicle interior, and in a mounting position provided on the right side of the vehicle, the communication area may extend to the right facing away from the vehicle interior.

The communication means may also be electrically conductive elements, but embodied to provide the communication function.

The detection function and the other function of the functional elements are referred to collectively as functions, or individually as the function of the functional elements. The functions of the functional elements are to be distinguished from a communication function, which can be provided by communication means.

A connection arrangement may further be provided for electrically connecting the functional elements to a processing arrangement to provide a connection interface for controlling the functional elements to assign functions according to a selected mounting position. The connection arrangement thus makes it possible to provide a connection interface for electrical connection between the processing arrangement and the functional elements, in order to provide the control in a flexible and adaptable manner via the electrical connection. Adaptation of the actuation may then be performed, for example, by the processing arrangement and/or by the connection arrangement itself. The use of the connection arrangement thus provides increased flexibility for the control of the functional elements. This has the further advantage that the use of the connection arrangement enables the functions of the two functional elements to be interchanged. In this way, the support element or the arrangement can be used both for the first mounting position and for the second or further mounting positions. Thus, the production effort is significantly reduced.

The electrically conductive functional elements may, for example, comprise an electrical conductor which is attached to the corresponding layer of the support element.

The layers are, for example, different layers of the support element. If the support element is a two-layer printed circuit board, in particular one that can be assembled and/or printed on both sides, the layers can correspond to these two layers on the two sides of the support element. The functional elements may then be provided on both sides, i.e. the first functional element on one side and the second functional element on the other side. Alternatively or additionally, communication means may also be provided on both sides in this regard.

In particular, in an arrangement according to the invention, a requirement with respect to the mounting positions may be defined that the functions, i.e. in particular the detection and further function (the further function preferably being a shielding function), and/or the communication function, must be provided in the same way on different sides of the vehicle. Concomitantly, a further requirement with respect to the mounting positions may be defined in that the functions must be arranged with the same orientation with respect to a vehicle center (and thus a vehicle interior) and thus symmetrically about the vehicle center. In this way, the similar function can be ensured, since, for example, a detection area facing away from the vehicle interior is always used for the detection function and/or communication area is always used for the communication function.

A conventional solution for taking this requirement into account is the use of different configurationss of the support element or the arrangement for the different mounting positions. For example, for each mounting position, a special configuration of the support element can be provided, in which the support element has, on several levels, electronics and arrangement of the functional elements and/or communication means adapted to the respective mounting position. According to the invention, however, it may be an advantageous solution to use only a single formation of the support element with the functional elements and/or communication means for both (or all) mounting positions. In this solution, the support element may be configured as a remote printed circuit board, and thus be remote from the further electronics (in particular the processing arrangement) providing the actuation. This allows a flexible and space-saving arrangement. A further advantage is that the remote circuit board is suitable for the different mounting positions. For example, the different mounting positions are provided on different vehicle sides (in particular left and right sides). Thus, the support element can preferably be mounted in left and right side door handles which are mounted at the mounting positions on the left and right sides of the vehicle. However, the orientation of the support element with respect to the longitudinal direction of the vehicle (in the direction of travel) and/or transverse direction of the vehicle (along the transverse axis of the vehicle) and/or in the direction of the vertical axis of the vehicle may be the same for the different mounting positions. More specifically, the support elements thus do not have to be reversed for mounting in different door handles on different sides of the vehicle, so that the manufacturing and mounting costs can be significantly reduced. The support element can thus be used particularly easily not only for one side of the vehicle, but for both sides of the vehicle without changing the orientation with respect to the vehicle directions. In contrast, the orientation with respect to a vehicle interior may be different. This is understood to mean that, in the case of the support element arranged on the left-hand side of the vehicle, a different outer side of the support element is oriented towards the vehicle interior than in the case of the support element arranged on the right-hand side.

Functionally, however, the arrangement with different orientation with respect to the vehicle interior may pose problems in meeting the requirement to provide the functions with the same orientation with respect to the vehicle interior. For example, the detecting function and/or communication function may always face away from the vehicle interior and the further function may face towards the vehicle interior, or vice versa. In the case of a fixed assignment of the further function to a specific layer, and of the detection and/or communication function to another specific layer, this would always be associated with a turning of the support element, if the support element is to be arranged on the left-hand and right-hand sides of the vehicle. According to a further advantage, this can be prevented by the fact that the different functional elements and/or the communication means are configured on different layers or sides of the support element, but otherwise in the same position and congruently.

The functional elements may be conductor paths and/or areas of the same configuration on different sides of the support element. The functional elements can optionally be operated according to a first function (detection function) or according to a second function (further function). Advantageously, the function can be determined or reconfigured in a simple manner by actuating the different (in particular left-hand and right-hand) functional elements in different ways. For this purpose, for example, a different connection configuration can be used to change the assignment of the functions, the connection configuration being adapted, for example, mechanically by the connection arrangement and/or electrically by the processing arrangement.

It is further conceivable that the layers of the support element are variably assigned the detection function and the further function in accordance with the selected mounting position as a function of a control via the connection arrangement (this assignment is also referred to as function assignment). For this purpose, once the selected mounting position is fixed, the assignment can be determined in various ways by adjusting the control:

the control is adapted by mechanically adapting the connection of the functional elements to the processing arrangement via the connection arrangement, this also being referred to as mechanical adaptation of the connection configuration, the control is adapted by electrically controlling the functional elements depending on the mounting position by the processing arrangement, this is also called electrical adaptation of the connection configuration.

In order to adapt the control, the signal paths to the functional elements via which the signals for controlling the detection function and for controlling the further function are transmitted by the processing arrangement can be adapted. This is also understood to include a connection configuration. In the mechanical adaptation of the connection configuration, the adaptation of the signal paths is achieved, for example, by "reversing" a counter connection arrangement, such as a plug, i.e. connecting it differently to the connection arrangement. In the case of electrical adaptation of the connection configuration, the signal paths can be adapted, for example, by reprogramming the processing arrangement, and, for example, different pins of a processing unit can be controlled.

It is further conceivable that the following assignments are exclusively possible by the function assignment, between which it is possible to switch by adjusting the control:

1. For the first level, the first function element provides the detection function and for the second level, the second function element provides the further function.

2. For the first level, the first function element provides the further function and for the second level, the second function element provides the detection function.

Thus, the function assignment can enable an exchange of functions. On the other hand, one communication means can always be operated in the same way, e.g. both communication means can always be controlled in the same way. In this case, there is no exchange of functions between the communication means.

According to a further possibility, it may be provided that the processing arrangement and/or the connection arrangement for adapting the control is adapted to perform the function allocation in the manner of determining which of the function elements is controlled according to the detection function and which of the function elements is controlled according to the further function. This enables the functions to be provided by the function elements at the levels according to the function assignment by controlling the function elements. Thereby, the function elements of a support element can always be operated with different ones of the functions in order to also assign different ones of the functions to the levels. This enables a synergetic use of the detection function for detection and the further function, which can be specifically a shielding function for the detection.

A further advantage within the scope of the invention can be achieved if the arrangement according to the invention comprises the processing arrangement, wherein the processing arrangement is configured to control the first functional element via at least a first connection element of the connection arrangement and the second functional element via at least a second connection element of the connection arrangement. For this purpose, the processing arrangement is connected to the connection arrangement, for example, in order to establish the electrical connection and thus the signal paths to the connection elements (in accordance with a mechanical connection configuration).

It may further be provided that the processing arrangement and/or the connection arrangement for adapting the control for the function allocation are implemented in such a way that the function allocation comprises (at least) a first allocation for the first mounting position and a second allocation for the second mounting position, in order to, in the first allocation
    the detection function via the first connection element and
        the further function via the second connection element, in particular in order to carry out the detection function in the manner of a detection in a first surrounding of the first function element and the further function in the manner of a shielding of the first function element from a second surrounding of the second function element,
and/or for the second assignment
    controlling the detection function via the second connection element and the further function via the first connection element, in particular in order to perform the detection function in the manner of detection in the second surrounding of the second function element and the further function in the manner of shielding the second function element from a first surrounding of the first function element,
so that preferably the detecting and shielding are performed on different ones of the levels and different ones of the surroundings depending on the mounting position. The adaptation of the control for the function assignment by the processing arrangement can be effected, for example, by electrically adapting (i.e., e.g., in accordance with a programming) the signal path via the connection elements via which the detection function and the further function are controlled. The adaptation of the control by the connection arrangement can also be carried out by mechanically changing the assignment of the signal paths to the connection elements (e.g. by a reconnection). The assignment of the connection elements to the functional elements, on the other hand, can be unchangeable, e.g. by a fixed connection via conductor paths.

In a further possibility, it may be provided that the connection arrangement for adapting the control for the function assignment is embodied in such a way that the connection arrangement comprises at least one first connection element electrically connected to the first function element and at least one second connection element electrically connected to the second function element, the connection elements being suitable for electrical connection to different counter connection elements of the processing arrangement in order to perform the function assignment by assigning the counter connection elements to the connection elements. In particular, the counter connection elements may be part of a counter connection arrangement such as a cable with a plug or plug receptacle to enable mechanical connection of the processing arrangement to the connection arrangement. Depending on how this connection is made (e.g. the plug is aligned), a different assignment of the counter connection elements to the connection elements can be made. This also changes the signal paths, since, for example, the detection function is controlled via a first counter connection element and the further function is controlled (fixed) via a second counter connection element. Depending on the assignment, the first counter connection element can then optionally be electrically connected to the first or second connection element in order to form the signal path for the detection function. On the other hand, the second counter connection element is then electrically connected to the other (not selected) of these connection elements in order to form the signal path for the further function in a corresponding manner.

According to a further possibility, it can be provided that the connection arrangement for adapting the control for the function assignment is configured in such a way that the connection interface is provided differently on the levels in each case in order to carry out a different assignment of counter connection elements of the processing arrangement to connection elements of the connection arrangement depending on the selected mounting position. For example, for this purpose the counter connection elements are always connected to the connection elements (for example in the form of a plug receptacle or a plug) with the same arrangement and orientation, the different assignment of the counter connection elements to the connection elements resulting from the fact that the connection elements are arranged differently on the different levels. In particular, for this purpose, the connection elements are arranged according to a different order, which may result from the use of vias. This makes use of the fact that, in the case of different mounting positions, the connection takes place on different of the levels (on the rear side of the support element, a different order of the connection elements is provided than on the front side, if the connection elements are each configured as vias).

It may further be provided in the context of the invention that the arrangement comprises the processing arrangement, wherein the processing arrangement for adapting the control for the function assignment is implemented in such a way that the processing arrangement selectively controls the first function element or the second function element according to the detection function, and controls the other of the function elements according to the further function. In this way, electronic adaptation of the connection configuration may be enabled. For the adaptation of the control, for example, a different programming of the processing arrangement or a different signal routing at the processing arrangement is provided. Then it is only necessary to provide different processing arrangements for different of the mounting positions, whereas the same support element is always used and only needs to be connected to different processing arrangements depending on the mounting position.

It is further conceivable that the processing arrangement is configured to perform the control of the functions according to a fixed assignment of at least two counter connection elements independent of the mounting position, wherein the connection arrangement comprises at least two connection elements for selective connection to different ones of the counter connection elements in order to perform the connection configuration on the basis of the counter connection elements selected for the connection, and thus to assign the detection function and the further function to the function elements and thus to the levels.

Optionally, it may be provided that the connection arrangement comprises at least two connection elements. The two connection elements can each be configured to provide the connection interface on both of the layers on both sides for connection to a counter connection element of the processing arrangement, preferably for detachably connecting (i.e. connecting) the functional elements on different outer sides of the support element, preferably the connection elements having at least one vias for this purpose. Thus, the connection arrangement is also suitable for different mounting positions. If the mounting positions comprise, for example, right-hand and left-hand mounting on the vehicle, in which the orientation of the support element is the same with respect to the vehicle directions (vertical, longitudinal and transverse directions), in this way the connection can always be made from the same side facing towards or away from the vehicle interior. For this purpose, the vias can be used to make a connection element accessible from both outer sides of the support element.

It is also optionally conceivable that the connection arrangement has the connection interface on both sides of the support element in order to connect at least one counter connection element selectively to the connection interface on one of the two outer sides of the support element in accordance with the different mounting positions, and in particular in order to carry out the functional assignment depending on the selected outer side on which the connection is made. In particular, by using vias on the support element, the contacting of a connection element for connection can be performed from both sides of the support element. However, depending on the side from which this contacting takes place, the arrangement of the connection elements may have a different order. This different order can be used, if necessary, to make the functional assignment (If, for example, the counter connection elements are always in the same arrangement and thus order). Alternatively or additionally, the arrangement of the connection elements can also be symmetrical, and some of the connection elements can be provided several times (and with the same function) in order to compensate for the different order when connecting.

A further advantage can be achieved within the scope of the invention if the connection arrangement has at least one first connection element which is electrically connected to the first function element in order to variably provide the control of the detection or the further function at the first function element, and/or has at least one second connection element which is electrically connected to the second function element in order to variably provide the activation of the detection or the further function in the second function element, and/or has a third and fourth connection element which are connected to a first and preferably (e.g. via vias) a second connection element which is electrically connected to the second function element in order to variably provide the activation of the detection or the further function in the second function element, and/or has a third and fourth connection element which are connected to a second and preferably (e.g. via vias) third connection element which are connected to a third and fourth connection element which are connected to a fourth and preferably (e.g. via vias) to a second communication means on the support element, in order to provide control of a communication function, preferably a near field communication, preferably NFC, thereover. Thus, the connection arrangement can be used, for example, as an electrical connection interface such as a plug or a socket for controlling the various functions. In order to provide additional stability of the contacting in addition to an electrical contacting necessary for this purpose, the connection arrangement may optionally comprise mechanical fastening means, such as latching means or the like. The connection elements themselves are configured, for example, as electrically conductive contacts and/or pins or the like.

It is further conceivable that a third and fourth connection element is arranged externally with respect to a first and second connection element of the connection arrangement on the support element. In this way, irrespective of the outer side of the support element from which the connection to the connection arrangement is made, the outer connection elements can always be assigned to the third and fourth connection element and thus, for example, to the communication function. Thus, the same counter connection arrangement of the counter connection elements can be used for both outer sides for connection. The internal connection elements can also be arranged symmetrically (e.g. in that two second connection elements are arranged externally to the first connection element). This also makes the contacting of the first and second connection elements independent of the outside for connection. Alternatively or additionally, the different order of the first and second connection elements can also be used to adapt the control for function assignment via this.

Advantageously, the invention may provide that the functional elements substantially and/or at least predominantly geometrically overlap each other, in particular in order to provide the further function as at least one-sided shielding of the detection function. In this respect, the geometrically identical arrangement has the advantage that an interchange of functions is possible. In other words, both the first and the second functional element can provide both functions (detection and further function).

It is further conceivable that the functional elements are arranged in the same position and, in particular, in congruence on the respective layers, preferably so that the detection function is provided in the same manner but for different surroundings, irrespective of the selection of the mounting position, in particular the same with respect to the position and extension of an electric field generated by the functional elements. In other words, the two layers and thus possibly also the two sides of the support element may have an at least partially or substantially identical layout in order to be able to provide the detection function on the two layers or sides. The electric field can thus be generated in the same way by the functional elements, and also be shielded in the same way by the opposite functional element when the opposite functional element is controlled according to the shielding function. In other words, the functional elements may be alternately controlled with the functions depending on the mounting position. In both mounting positions, the field then always extends, for example, in an surrounding which, starting from the support element, leads away from the vehicle interior.

Furthermore, it may be advantageous in the context of the invention that the support element for mounting at the mounting positions is embodied on opposite sides of the vehicle, and preferably has a mounting adaptation adapted to the mounting positions in such a way that mounting at the mounting positions with the same orientation in the longitudinal direction of the vehicle is feasible and, in particular, with different orientation in the longitudinal direction of the vehicle is prevented, preferably so that, when mounting at the first mounting position, the first layer faces away from an interior space of the vehicle and the second layer faces the interior space, and when mounting at the second mounting position, the second layer faces away from the interior space and the first layer faces the interior space, in particular in order to provide the detection and further function symmetrically on the vehicle. In this way, the support element can be used for both mounting positions, in which case only other layers or side surfaces of the support element are oriented towards the interior. In other words, for different mounting positions, the layers are oriented differently with respect to the interior (however, with respect to the vehicle directions left, right and front, rear, the support element may be oriented the same for both mounting positions). Nevertheless, if necessary, the detection function and the further function should be oriented in the same way with respect to the passenger compartment, for example, the further function should always face the passenger compartment and the detection function should face away from the passenger compartment (in order, for example, to enable detection of the activation action from the outside). Alternatively, the detection function may face the interior space and the further function may face away from the interior space, for example to enable detection of the activation action in a door handle recess. The orientation of the detection function and the further function can thus be symmetrical on the vehicle, since the detection function together with the further function defines the location at which the activation action can be detected. The symmetrical provision comprises in particular an arrangement of the electric field generated by the detection function symmetrically about an axis of symmetry in the longitudinal direction of the vehicle, and if necessary in a corresponding manner the symmetrical shielding by the shielding function.

It may further be provided that the support element is configured for selective mounting at one of the at least two different mounting positions of the vehicle, in that the support element can be mounted at one of the mounting positions as well as at the other mounting position, and has a geometrical configuration adapted accordingly thereto. Alternatively or additionally, the mounting positions may differ in that different ones of the two layers, in particular the side surfaces thereof, of the support element face an interior of the vehicle.

It is furthermore advantageous if, within the scope of the invention, the support element is configured as an at least or exactly two-sided printed circuit board in order to provide a double-sided receptacle for the functional elements, in which the first functional element is fastened to a first outer side of the support element and the second functional element is fastened to an opposite second outer side of the support element, in order to provide the detection and further functions on different outer sides and/or to make the functional elements and, if appropriate, also the connection arrangement accessible from both outer sides. The at least or exactly two-sided printed circuit board can thus have at least or exactly two layers which are configured to accommodate the functional elements on both sides.

Furthermore, it can be provided within the scope of the invention that the functional elements are each configured both as a capacitive sensor electrode for providing the detection function and as a shielding electrode for providing the further function, in order to provide the functions depending on the function assignment and selected mounting position, wherein preferably the functional elements are each configured geometrically identically with a planar shape for this purpose. The same configuration thereby makes it possible to be configured both as a shielding electrode and as a sensor electrode. Preferably, the functional elements can each have spaced surface elements, in particular ribs, which serve to reduce eddy current losses at an adjacent communication interface surrounding the functional elements.

The detection function and thus the functional element used to provide the detection function can be controlled, for example, by repeatedly charging and discharging this functional element. In this way, by an evaluation of this charging and discharging by the processing arrangement (e.g. by a charge accumulation of the charge supports transferred in the process), for example, a variable capacitance can be determined which is provided by the functional element with respect to the surrounding of the functional element. This variable capacitance can in turn be dependent on the surrounding, so that in this way the activation action can be detected in the surrounding.

It is also possible that the function element controlled for this purpose is connected to a fixed electrical potential (e.g. a ground potential) in order to control the shielding function. It is also possible that the functional element controlled for this purpose is always controlled with the same potential as the functional element used for the detection function. In other words, the electrical potential at the functional element used to provide the shielding function follows the electrical potential at the functional element used to provide the detection function. Thus, both functional elements can be controlled for capacitive detecting and serve this in different ways (generation of the electric field by the detecting function and shielding by the shielding function).

For example, it can be provided that the processing arrangement is configured to alternately (and in particular never simultaneously) control the functional elements for capacitive detection and a communication interface for near field communication (in particular for NFC, i.e. near field communication) surrounding the functional elements via the connection arrangement. Thus, a compact arrangement can be provided in order to provide the functions in a space-saving manner.

According to a further advantage, it can be provided that the support element is configured as a printed circuit board with the at least or exactly two layers, in particular as a multilayer board, wherein a connection arrangement is arranged on both layers, in particular by means of at least one vias. This allows the connection arrangement to be accessible from both sides.

It may be provided that the first and second layers are directly adjacent and/or interconnected and/or in contact with each other and/or the only layers, in particular planes, of the support element. In this way, the advantage may also be obtained that the functional elements and/or the communication means are arranged opposite and/or immediately adjacent. Thus, an electrical and/or magnetic interaction can be generated between the functional elements and/or communication means.

In a further possibility, it may be provided that the communication means are each configured to generate a communication field, preferably magnetic field, to generate a (the at least one) communication area(s), respectively. In other words, a plurality of communication areas may also be provided, each of which is generated by one of the communication means or the communication field. Further, the communication means may be geometrically arranged in parallel such that the communication fields and in particular therefore the communication areas extend on both of the layers, in particular substantially symmetrically and/or substantially spatially equally. Thus, the suitability of the at least one communication area for different selected mounting positions can be achieved by generating a communication area at each of the layers, and the communication areas can further extend symmetrically. For example, when mounting at the first mounting position, (in particular only) one of the communication areas may be used, and when mounting at the second mounting position, the other of the communication areas may be used instead.

A parallel arrangement of the communication means, in particular in the manner of a parallel routing of the communication means, has the advantage that the communication fields can be generated magnetically and geometrically symmetrically by the communication means. An equal current flow through the communication means may thereby cause a substantially equal field strength distribution of the communication fields. Furthermore, a forced symmetrization by the symmetrical coupled communication fields is also possible (in the context, one may speak of a magnetic symmetrization of the communication fields).

It can also be advantageous if the communication means have the same length. This is understood to mean the length of the current path provided by the respective communication means.

Advantageously, it can be provided within the scope of the invention that the communication means are arranged on the respective layers in such a way that the magnetic fields (communication fields) generated by the communication means are symmetrical, in particular magnetic, and in particular are configured to be essentially the same with regard to the field strength (and in particular the field strength distribution), in order preferably to generate the communication area (similar) for near-field communication on both sides of the support element. By similar it is understood in particular that the usable communication area is substantially the same. This can be achieved, for example, by a geometrically parallel arrangement and electrical parallel connection of the communication means.

A further advantage can be achieved within the scope of the invention if the communication means at least partially overlap geometrically and/or run geometrically parallel and/or are configured to be congruent in order to generate the (i.e. one of the at least one) communication area(s) on both sides of the support element in each case, so that preferably, depending on the selected mounting position, another of the communication areas faces away from an interior of the vehicle. Thus, the communication area may be accessible for communication, which is generated at the layer facing away from the interior. In particular, the communication area faces away from the passenger compartment when it is generated by the communication means facing away from the passenger compartment.

For example, it may be provided that the communication means are arranged at such a small distance from one another that mutual magnetic coupling, in particular for symmetrizing the fields, takes place as a result of the magnetic fields (communication fields) generated by the communication means. In this case, one can also speak of a forced symmetrization by the symmetrically coupled fields. The distance in this case is, for example, a maximum of 1 cm or a maximum of 2 cm or a maximum of 5 cm. In particular, the layers can be directly adjacent for this purpose and thus in particular contact.

Furthermore, it may be provided that the communication means are configured and/or arranged relative to each other such that a (mutual) magnetic coupling is thereby provided by the communication means. The communication means can each be configured to generate a communication field, preferably a magnetic field, in order to generate a communication area in each case, wherein the communication means can be arranged geometrically parallel, so that preferably the communication fields and in particular the communication areas extend on both of the layers—and in particular symmetrically. The magnetic coupling can be provided for these communication fields. Here, the coupling factor may be, for example, between 0.6 and 0.99, preferably between 0.9 and 0.95. In other words, in this way the total inductance may be approximately equal to the individual inductance of the communication means. Although the communication means may be (circuit-wise) connected in parallel with each other, also then in this way the field strength of the single communication field may be nearly equal to that of a single communication means (in particular coil) not connected in parallel. As a result, the loss of field strength caused by the parallel connection of the communication means can be reduced, for example to a maximum of half. The communication means, i.e. in particular the conductor paths of the communication means, can thereby be spatially so close to one another (i.e. spatially and/or geometrically parallel, for example) that the aforementioned effect (magnetic coupling) or the high coupling factor is achieved. This also achieves very good field symmetry.

Furthermore, it can be provided that the communication means each form an antenna for near-field communication, preferably an NFC antenna. This enables communication in the communication area, for example for authentication of a mobile device such as an ID transmitter on the vehicle. It may also be possible to generate inductive power through the near-field communication in the communication area, in order to supply the mobile device with power for authentication.

It is also optionally conceivable that the communication means are each in the form of a conductor path in loop form and/or a loop antenna and/or a coil for near-field communication. This enables particularly reliable communication.

In addition, it is advantageous if the support element is configured for mounting at the mounting positions on opposite sides of the vehicle, but with the same orientation along a longitudinal direction of the vehicle and/or transverse direction of the vehicle and/or vertical direction of the vehicle, the communication means preferably being arranged on both sides of the support element in order to provide the communication area with the same function on the opposite sides of the vehicle. By functionally identical it is understood in particular that the communication function can be provided with the same communication area and/or geometric extension of the communication area with respect to the vehicle interior (i.e. symmetrically around the vehicle interior and/or in a direction pointing away from the vehicle interior). Preferably, the communication area may be defined as a near field at the door handle in the outer area of the vehicle.

Furthermore, it may be provided within the scope of the invention that at least one vias of a connection arrangement is provided on the support element in order to connect the communication means in parallel with one another (in terms of circuitry), and preferably at least one further vias of the communication means is provided in order to additionally electrically connect the communication means to one another. The further connection enables an additional reduction in power dissipation. In this case, the additional connection can be made, for example, approximately over the same length of the communication means, and/or in each case spaced apart from the vias for the parallel connection.

Optionally, it may be provided that a connection arrangement is provided on the support element in order to provide a connection interface with the communication means, the connection arrangement being configured for connection to a processing arrangement on both sides. For this purpose, the connection arrangement has, in particular, vias to enable the connection on both sides.

Preferably, it can be provided within the scope of the invention that a connection arrangement is provided on the support element, the connection arrangement having at least two outer connection elements in order to provide a connection interface with the communication means, and preferably having at least two further internal and functionally identical connection elements which are directly electrically connected to one another, in particular short-circuited, via a connection element in order to provide a compensation function for the outer connection elements. The connection elements with the same function can, for example, be connection elements which lead to the same electrical potential, in particular functional element. Thus, the connection elements may be redundant connection elements. However, the connection by the connection element may enable the compensation function to be activated when a counter connection arrangement is connected. For this purpose, a circuit is closed by the counter connection arrangement, for example, which is configured by the functionally identical connection elements and the connection element.

Furthermore, it may be advantageous in the context of the invention to provide a connection arrangement on the support element and a counter connection arrangement, in particular in the form of a ribbon cable, for connection to the connection arrangement, wherein preferably the counter connection arrangement comprises the following:

a first counter connection element to provide a current path for controlling at least one function of the arrangement, in particular by electrical connection to one of the function elements, at least two second and, in particular, functionally identical counter connection elements in order to provide (in particular jointly) a current path for controlling at least one further function of the arrangement, in particular by means of an electrical connection to the other of the function elements, at least a third and fourth counter connection element to form a circuit with the communication means for controlling the communication function.

It may be possible that the counter connection elements are arranged or extend at least partially spatially parallel and adjacent to each other. The counter connection elements may, for example, be configured as elongated electrical conductors. The first counter connection element may be arranged between the second counter connection elements, and the second counter connection elements may be arranged between the third and fourth counter connection elements. Further, the second counter connection elements may be electrically connected to each other via at least one connecting element (in particular via two connecting elements when connected to the connection arrangement) to provide a compensation circuit for reducing or preventing the communication area in the area of the counter connection arrangement, preferably extending between a first one of the connecting elements of the connection arrangement and a second one of the connecting elements of the counter connection arrangement. In this regard, the advantage may be obtained that the communication area is generated only at the layer and not at the counter connection arrangement. Advantage is taken of the fact that the compensation circuit interacts with the third and fourth counter connection elements. In this regard, the third and fourth counter connection elements, like the communication means, generate a magnetic field which can in principle be used for communication. However, this field is neutralized by the adjacent arrangement of the compensation circuit.

It may optionally be possible for a connection arrangement to be provided to provide a connection interface with the communication means, wherein the connection arrangement is configured to connect to a processing arrangement at both ends. The processing arrangement may thereby optionally control the communication and in particular generate the communication field by a charge transfer via a third and fourth counter connection element.

Furthermore, it is optionally provided that the support element is configured as a printed circuit board having the at least or exactly two layers, in particular as a multilayer board, wherein a connection arrangement is arranged on both layers, in particular connected by at least one vias. In this way, a versatile and compact configuration is obtained.

Also an object of the invention is a method for providing at least one communication function for electronics of a vehicle. Here, it is provided that a first and a second communication means are provided at different layers of a support element, the communication means being arranged opposite each other and electrically connected in parallel to generate at least one communication area which is suitable for different selected mounting positions on the vehicle. Thereby, the following steps can be carried out, preferably one after the other or in any order, whereby individual steps can also be carried out repeatedly:

Selectively performing a mounting of the support element at at least a first or second one of the mounting positions, the mounting positions being specific to different sides of the vehicle, Connecting a processing arrangement to a connection arrangement on the support element to electrically connect the communication means to the processing arrangement, the connection arrangement providing a connection interface for controlling the communication function.

Thus, the method according to the invention provides the same advantages as have been described in detail with reference to an arrangement according to the invention. Moreover, the method may be suitable for assembling an arrangement according to the invention. Furthermore, it is conceivable that the support element with the communication means and the connection arrangement and in particular the processing arrangement are configured according to an arrangement according to the invention.

Also an object of the invention is a method for providing at least one function for electronics of a vehicle.

In this case, it is provided in particular that a first and a second electrically conductive functional element are provided on different layers of a support element in order to provide, variably assigned, a detection function for one of the layers and a further function, in particular a shielding function, for the other of the layers.

In the process according to the invention, the following steps can thereby be carried out, wherein the steps can in particular be carried out in the order indicated or in any order, and if necessary also repeatedly.

performing an mounting of the support element selectively at at least a first or second mounting position, the mounting positions being specific to different sides of the vehicle, connecting a processing arrangement to a connection arrangement on the support element to electrically connect the functional elements to the processing arrangement, the connection arrangement providing a connection interface for controlling the functional elements, Adjustment of the control of the function elements for the assignment of the functions depending on the selected mounting position.

Thus, the method according to the invention provides the same advantages as have been described in detail with reference to an arrangement according to the invention. It may also be possible for the support element with the functional elements and the connection arrangement, and in particular the processing arrangement, to be configured in accordance with an arrangement according to the invention.

The adaptation of the control can be done, for example, by the processing arrangement performing the control via the connection arrangement according to the function assignment (e.g., controlling a certain one of the functional elements according to the detection function and the other one according to the shielding function). It may also be possible for the adjustment of the control to be performed by adjusting the circuitry at the connection interface. For this purpose, for example, a counter connection arrangement of the processing arrangement is connected from different outer sides of the support element.

In addition, it is conceivable within the scope of the invention that the mounting takes place at the first mounting position in a left-hand side door handle of the vehicle and at the second mounting position in a right-hand side door handle of the vehicle, in order to provide the detection function as a capacitive detection for detecting an activation action at the vehicle, and preferably to provide a communication interface of the vehicle for communication with an ID transmitter (for example for authentication). In particular, the door handle may be configured as a flush door handle or recessed handle. Further, according to the detection function, an edge-sensitive sensor can optionally be provided, in which, during the detection of the activation action, a direction from which a movement and/or approach to the support element occurs can be distinguished. Accordingly, a distinction can be made between a change in the surrounding at a first or a second edge of the support element.

Figure 2:
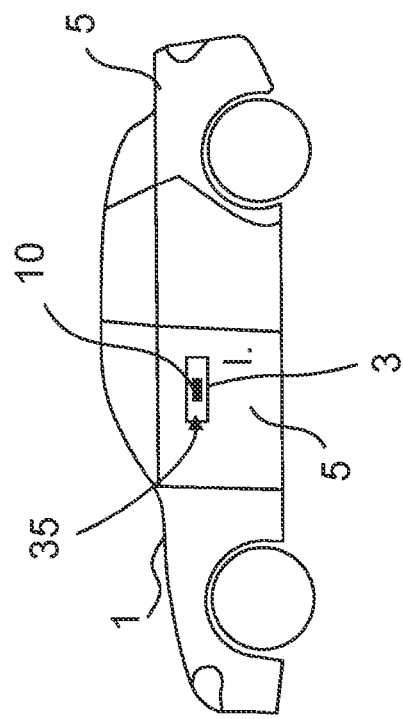
Figure 3:
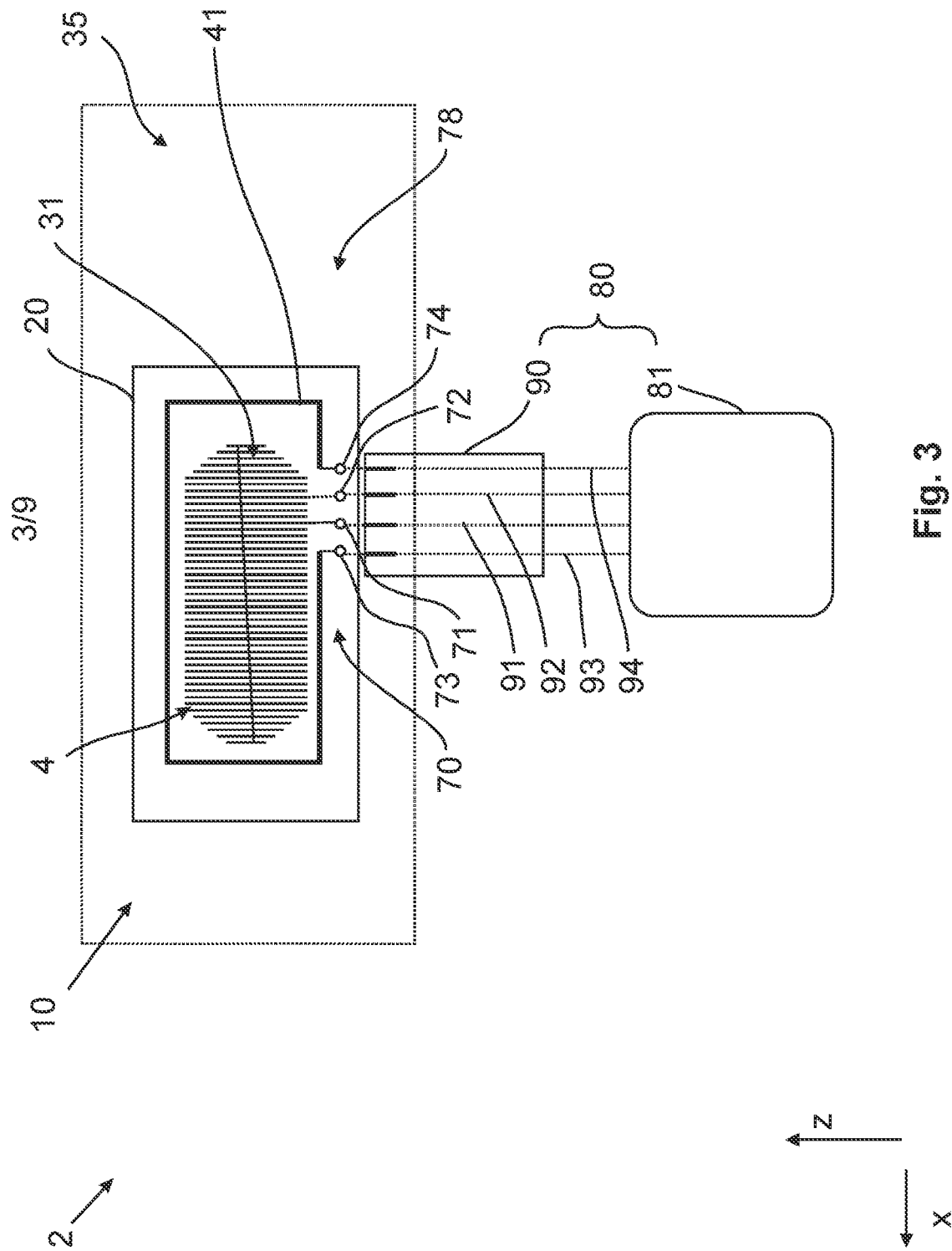
Figure 4:
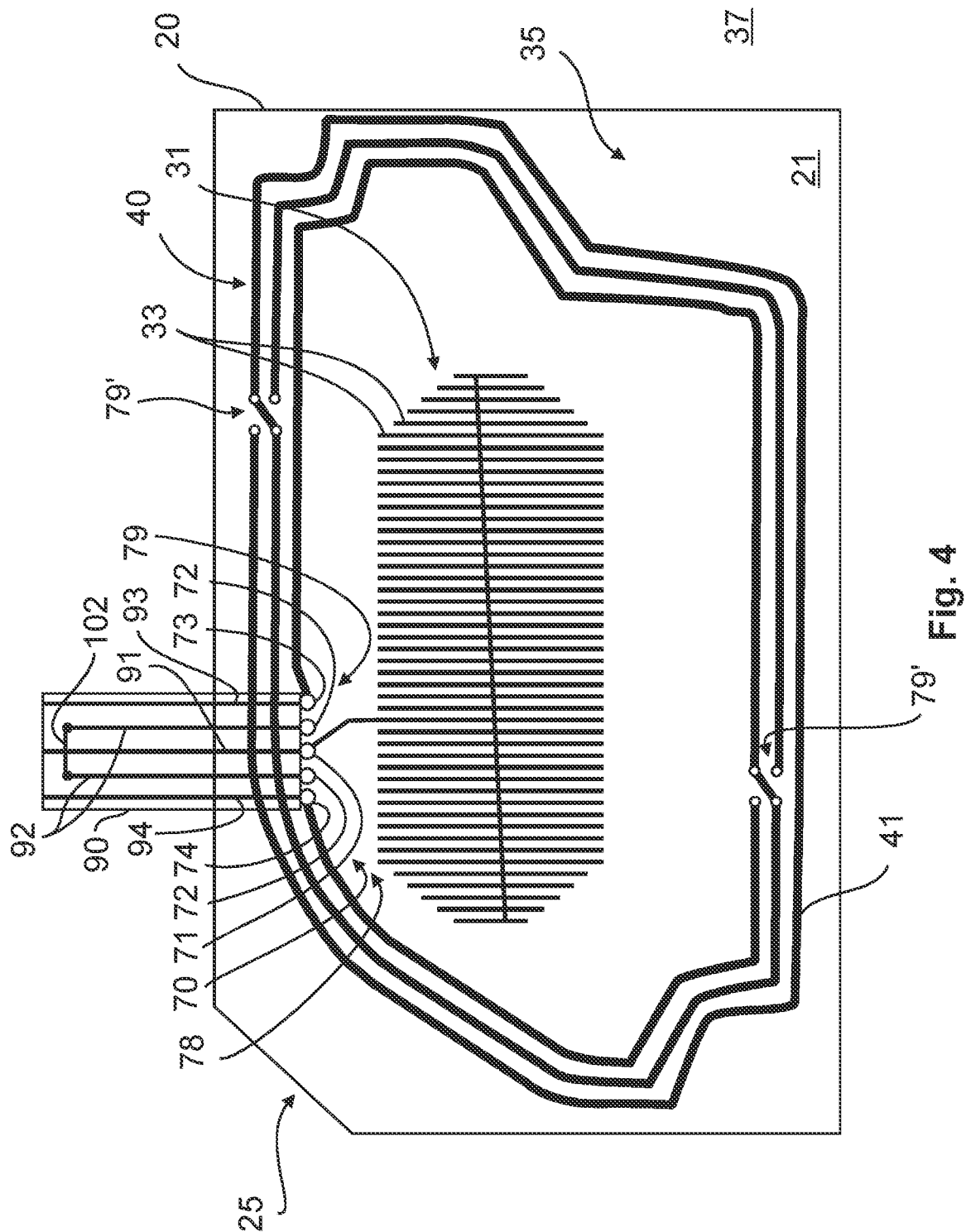
Figure 5:
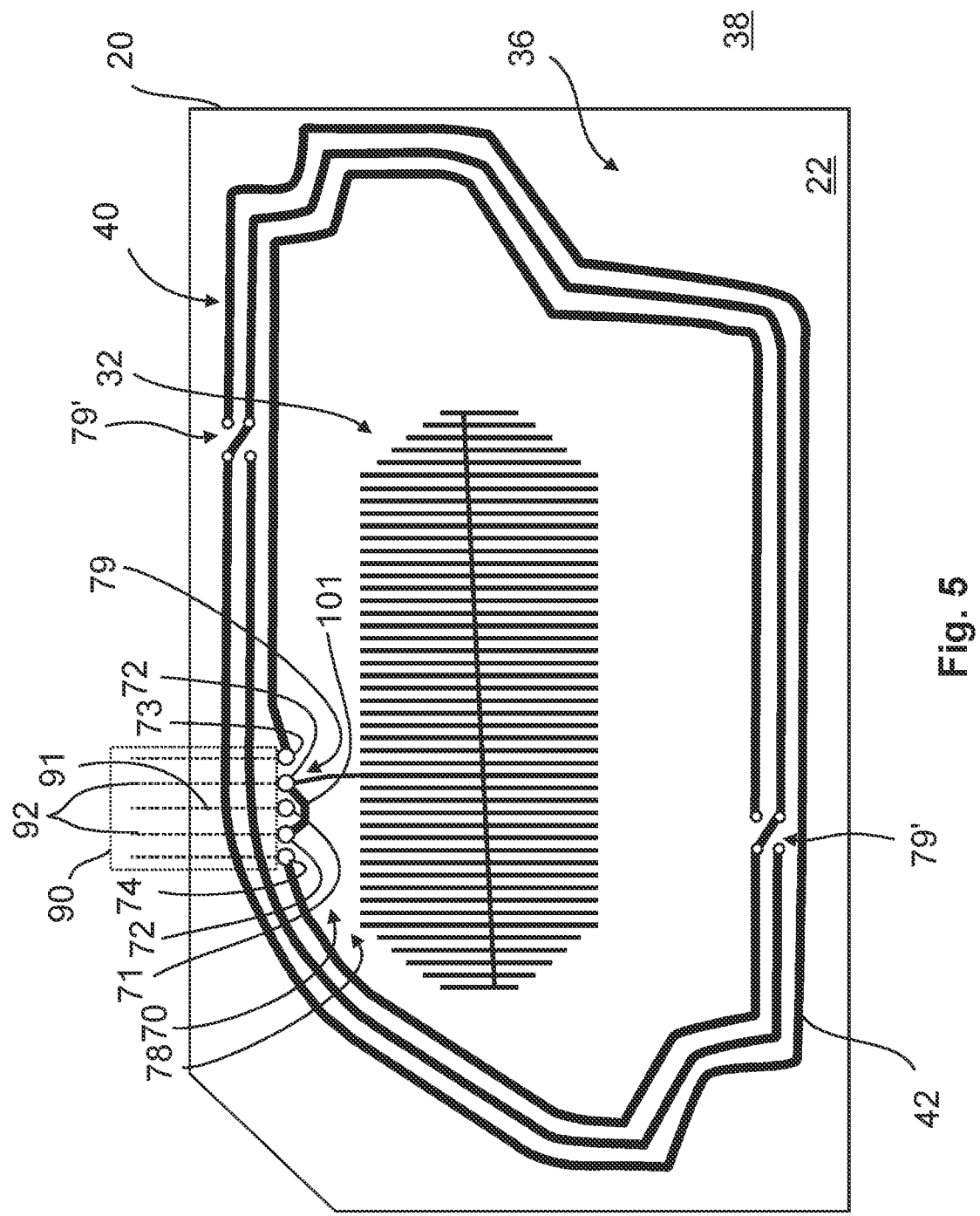
Figure 6:
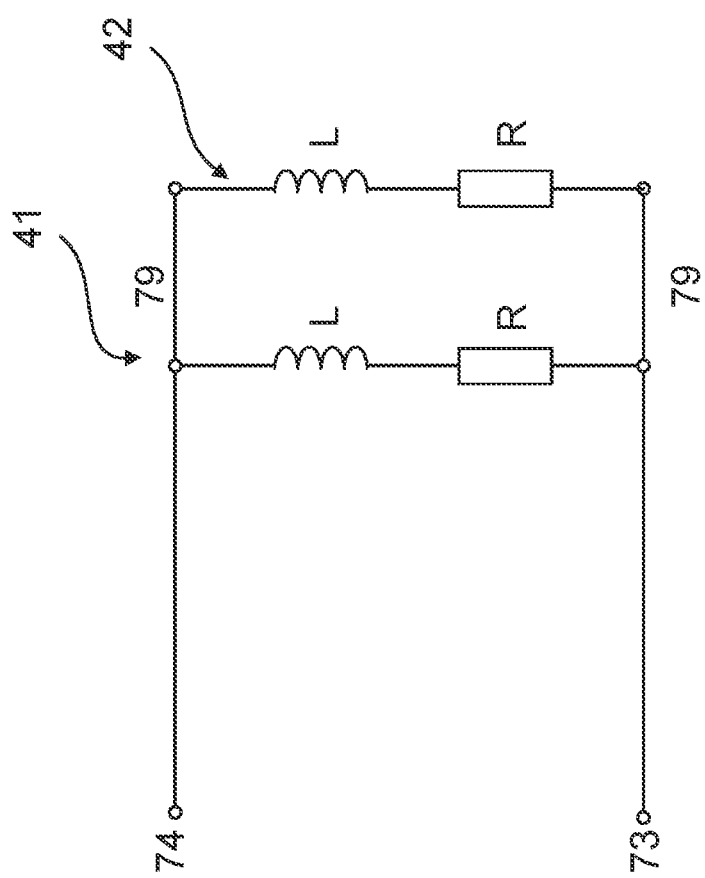
Figure 7:
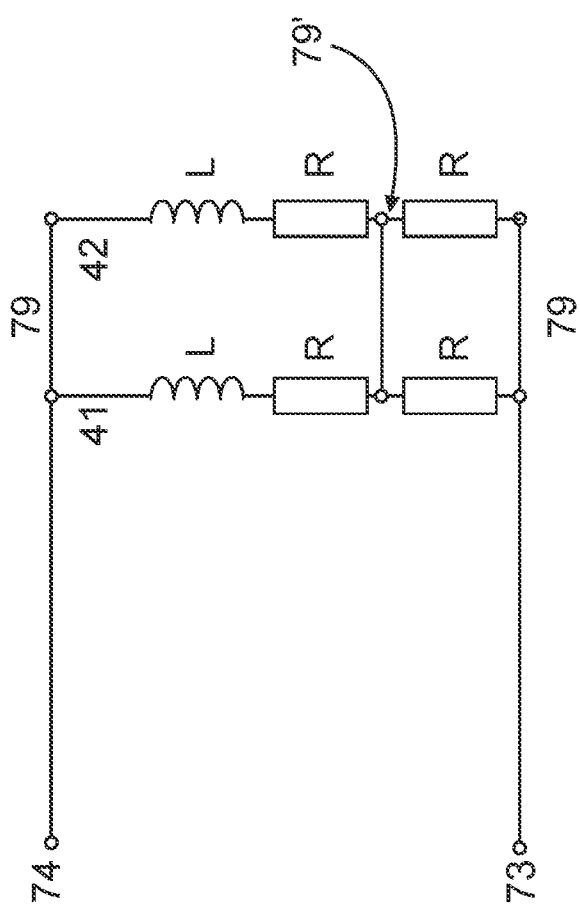
Figure 8:
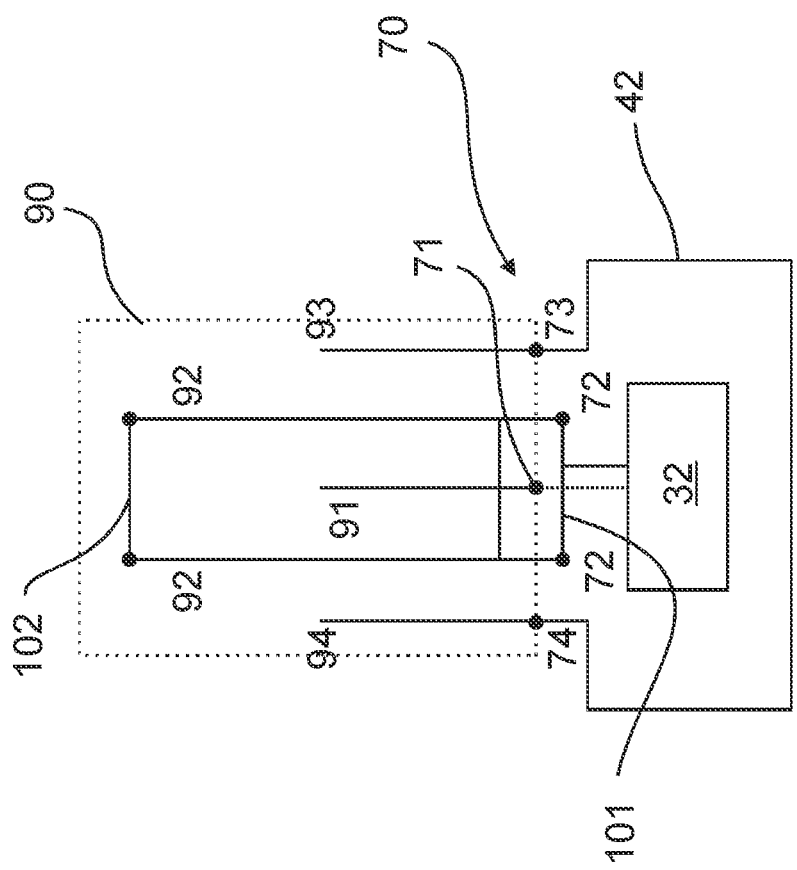

Further advantages, features and details of the invention will be apparent from the following description, in which embodiments of the invention are described in detail with reference to the drawings. In this connection, the features mentioned in the claims and in the description may each be essential to the invention individually or in any combination. Showing:

FIG. 1 a schematic top view of a vehicle with an arrangement according to the invention, FIG. 2 a schematic side view of a vehicle with an arrangement according to the invention, FIG. 3 a schematic front view of an arrangement according to the invention, FIG. 4 a further schematic front view of an arrangement according to the invention, FIG. 5 a schematic rear view of an arrangement according to the invention, FIG. 6 a schematic diagram visualizing the interconnection of the communication means of an arrangement according to the invention, FIG. 7 another schematic diagram visualizing the interconnection of the communication means of an arrangement according to the invention, FIG. 8 a schematic representation of a connection arrangement and a counter connection arrangement connected thereto, and FIG. 9 a schematic representation for visualizing a process according to the invention.

In the following figures, the identical reference signs are used for the same technical features even of different embodiments.

In FIG. 1, a vehicle 1 with at least one arrangement 10 according to the invention is shown in a plan view, wherein the vehicle directions x, y are marked. In FIG. 2 the vehicle 1 is also shown, but in a side view corresponding to the marked vehicle directions x and z. In FIG. 1 two mounting positions II of the vehicle 1 are shown, whereby in FIG. 2 the top view is of the first mounting position I. The first mounting position I may be the position for a door handle provided on the left-hand side. The first mounting position I may denote the position for a door handle 3 provided on the left side of the vehicle 1, and a second mounting position II may denote the position for a door handle 3 provided on the right side of the vehicle 1. Alternatively, the mounting positions I, II may also designate the positions in the respective door handle 3, whereby the door handle 3 need not yet be located on the vehicle 1 when the arrangement 10 is integrated into the door handle 3. Thus, the mounting of the arrangement 10 according to the invention can, for example, first be carried out in the door handle 3, and the door handle 3 can then be mounted in the corresponding position on the vehicle 1.

FIG. 3 shows the arrangement 10 according to the invention in the same view as in FIG. 2, being a view of the arrangement 10 as it may be mounted on the vehicle 1 at the first mounting position I according to FIG. 2. The vehicle directions are also indicated in FIG. 3 for better illustration of the arrangement, where in all figures x denotes a longitudinal vehicle axis (in the vehicle direction), y denotes a transverse vehicle axis and z denotes a vertical vehicle axis. In order to reduce the arrangement and the costs of manufacture and mounting, it may be provided that only one same support element 20 is used for all mounting positions I, II. Moreover, this may always be mounted with the same orientation in the directions x, y and z. As a result, for the different mounting positions I, II, different ones of the outer sides 35, 36 of the support element 20 face the interior 7 or face the vehicle surrounding (see FIG. 1). The first outer side 35 can thus face away from the interior 7 in the first mounting position I and face the interior 7 in the mounting position II, whereby in both mounting positions II the orientation in x, y and z direction corresponds to the orientation shown in FIG. 3. Mentally, the support element 20 is thus only moved from the left to the right of the vehicle for the change from the first to the second mounting position II.

The arrangement 10 according to the invention may provide different functions on different sides. On a first outer side 35 of the left-hand side door handle 3, and thus at the first mounting position I, a detection function can be provided, for example. On the other hand, on the first outer side 35 of the right-hand side door handle 3, and thus at the second mounting position II, another function such as a shielding function may be provided. Further, at the second outer side 36 of the first mounting position I, the further function may be provided, and at the second outer side 36 of the second mounting position II, the detecting function may be provided. Thus, as can be seen from the embodiments, a consideration of the mounting positions I, II may be necessary for the functionality of the arrangement according to the invention. In particular, this consideration may be performed as a function exchange and thus as a function allocation. Alternatively or additionally, a communication function may be provided on both outer sides 35, 36 in order to always generate a communication area usable from outside the vehicle 1.

Accordingly, in an arrangement 10 according to the invention, a requirement may be defined with respect to the mounting positions I, II that the functions, i.e. in particular the detection and further function, and/or the communication function, must be provided in the same way on different sides of the vehicle 1. Concomitantly, a further requirement with respect to the mounting positions I, II may be defined that the functions must be arranged with the same orientation with respect to a vehicle center (and thus an interior 7 of the vehicle) and thus symmetrically about the vehicle center. For example, the detection function allows to detect as an activation action an approach from outside the vehicle 1 to the door handle. For this purpose, however, a detection field must be generated which is located to the left of the door handle 3 in the case of the left-hand door handle 3 and to the right of the door handle 3 in the case of the right-hand door handle 3 (cf. FIG. 1). Alternatively or additionally, it may be necessary for a communication function to enable communication with an ID transmitter 6, irrespective of which mounting position I, II has been selected for the arrangement 10. After successful authentication by the communication, for example, activation of a further activation function of the vehicle may occur, for example when the detection function detects the activation action. This may be an unlocking or locking or opening movement of a flap 5 (such as a side door or sliding side door or a front or tailgate) of the vehicle 1.

In order to meet these requirements, an arrangement 10 according to the invention may be provided for providing at least one function for electronics 2 of the vehicle 1, preferably for a door handle electronics 2 of the vehicle 1, preferably for a capacitive sensor 4 for detecting an activation action at the vehicle 1 and/or for a communication interface 40 of the vehicle 1, in particular for communicating with an ID transmitter.

It is possible that the support element 20 is suitable for mounting at the mounting positions I, II on different sides of the vehicle 1 in order to selectively (i.e. according to a selection of the mounting position I, II) perform the mounting at least at a first I or second II of the mounting positions I, II. This makes it possible to use the same support elements 20 (i.e. support elements 20 of the same configuration) for different mounting positions I, II. The support element according to FIG. 3, but also e.g. according to FIGS. 4 and 5, has a corresponding suitability, since it can be mounted in door handles 3 for the left and right sides. This is favored, for example, by an appropriate arrangement of fastening means such as screw holes and a geometry adapted to the door handles 3. In addition, the support element 20 may also have at least one mounting adaptation 25 adapted to the mounting positions I, II in such a way that the mounting at the mounting positions I, II is feasible with the same orientation in the longitudinal direction x of the vehicle (and possibly also y, and z direction) and is prevented, in particular, with different orientation in the longitudinal direction x of the vehicle.

Furthermore, an arrangement 10 according to the invention can have a first electrically conductive functional element 31 on a first layer 21 (see FIGS. 3 and 4) and a second electrically conductive functional element 32 on a second layer 22 (see FIG. 5) of the support element 20. The functional elements 31, 32 can be arranged one above the other and be at least partially congruent, and if necessary also actually at least partially overlap geometrically, in order to provide a variably assigned detection function for one of the layers 21, 22 and a further function, in particular a shielding function, for the other of the layers 21, 22. The positionally identical and congruent configuration can be seen in FIGS. 4 and 5 for both functional elements 31, 32 and layers 21, 22, respectively. The congruence depends on the parts of the functional elements 31, 32 that are essential for the function, in particular the surface elements 33, which can thus be completely congruent. This allows both functional elements 31, 32 to perform essentially the same function, and thus the function is interchangeable.

Furthermore, a connection arrangement 70 may be provided for electrically connecting the functional elements 31, 32 to a processing arrangement 80 in order to provide a connection interface 78 for controlling the functional elements 31, 32 for the assignment of the functions according to the selected mounting position I, II. In particular, through this function assignment, the function exchange may be achieved. In particular, the processing arrangement 70 may comprise a processing unit 81 such as a microcontroller or the like for the control.

Furthermore, it may be possible that a first communication means 41 is arranged at a first level 21 of the support element 20, and a second communication means 42 is arranged at a second level 22 of the support element 20, wherein the communication means 41, 42 are arranged opposite to each other and electrically connected in parallel to create at least one communication area suitable for different selected mounting positions I, II. A corresponding configuration can be seen in particular in FIGS. 4 and 5. The communication means 41, 42 thereby surround the optional functional elements 31, 32, resulting in a compact and space-saving arrangement. A (or the) connection arrangement 70 may be provided to enable electrical connection of the communication means 41, 42 to the processing arrangement 80 to provide a connection interface 78 for controlling the communication means 41, 42.

Furthermore, it is shown that the communication means 41, 42 are geometrically arranged in parallel to generate a communication field, preferably a magnetic field, symmetrically on both of the layers 21, 22. Shown in FIGS. 4 and 5 are the communication means 41, 42 each in the form of a conductive path in loop form, in particular a loop antenna or a coil for near field communication.

FIGS. 6 and 7 each show a schematic equivalent circuit diagram of the parallel-connected communication means 41, 42, which each have an inductance L and a resistance R. The resistance R is specific to the so-called copper loss. The resistance R is specific to the so-called copper loss. By the shown parallel connection of the communication means 41, 42 via the vias 79 of the connection arrangement 70, a reduction of this copper loss can thereby be achieved. At the same time, by the adjacent arrangement of the two communication means 41, 42 on adjacent layers 21, 22, the magnetic interaction between the communication means 41, 42 can achieve the improvement of a respective communication field for communication, in particular equalization of the spatial extent of these communication fields. In order to further reduce the power dissipation, a further vias 79' can also be provided according to FIG. 7 in order to additionally electrically connect the communication means 41, 42 to one another.

It is shown in FIGS. 3 to 5 that the connection arrangement 70 comprises at least a first connection element 71, which is electrically connected to the first function element 31 in order to variably provide the control of the detection or the further function at the first function element 31, and at least a second connection element 72, which is electrically connected to the second function element 32, to variably provide thereover the control of the detection or the further function at the second function element 32, and a third 73 and fourth 74 connection element which are electrically connected to a first 41 and preferably a second 42 communication means at the support element 20 to provide thereover a control of a communication function, preferably a near field communication, preferably NFC.

As shown in FIGS. 4 and 5, the connection arrangement 70 and/or functional elements 31, 32 and/or communication means 41, 42 may comprise a plurality of vias 79, 79'. The vias 79, 79' may perform several tasks:

providing the connection interface 78 on several of the layers 21, 22, in particular so that connection is possible on both outer sides 35, 36 of the support element 20, preferably through the vias 79 of the connection elements 71, 72, 73, 74

Providing the parallel connection of the communication means 41, 42, in particular through the vias 79 of the connection elements 73, 74, Providing an additional connection of the communication means 41, 42 by at least one further vias 79'.

The processing arrangement 80 and/or the connection arrangement 70 may be adapted to adapt the control to perform the function allocation in the manner of determining which of the function elements 31, 32 is controlled according to the detection function and which of the function elements 31, 32 is controlled according to the further function. In particular, the arrangement 10 may comprise the processing arrangement 80, wherein the processing arrangement 80 is adapted to control the first function element 31 via the first connection element 71 and the second function element 32 via the second connection element 72, wherein the processing arrangement 80 and/or the connection arrangement 70 is adapted to adapt the control for the function allocation in such a way that the function allocation comprises a first allocation for the first mounting position I and a second allocation for the second mounting position II, in order to perform the function allocation in the manner of a determination of which of the function elements 31, 32 is controlled according to the detection function and which of the function elements 31, 32 is controlled according to the further function in the case of the first allocation.

controlling the detection function via the first connection element 71 and the further function via the second connection element 72, in particular in order to perform the detection function in the manner of a detection in a first surrounding 37 of the first function element 31 and the further function in the manner of a shielding of the first function element 31 from a second surrounding 38 of the second function element 32, and in order to be able to make the second assignment.

controlling the detection function via the second connection element 72 and the further function via the first connection element 71, in particular to perform the detection function in the manner of detecting in the second surrounding 38 of the second function element 32 and the further function in the manner of shielding the second function element 32 from a first surrounding 37 of the first function element 31, so that the detection and shielding are carried out on different ones of the layers 21, 22 and different ones of the surroundings 37, 38 depending on the mounting position I, II.

The connection arrangement 70 may be further configured to adapt the control for the function assignment in such a way that the connection elements 71, 72 are adapted to be electrically connected to different counter connection elements 91, 92 of the processing arrangement 80 in order to perform the function assignment by assigning the counter connection elements 91, 92 to the connection elements 71, 72. For example, it is shown in FIG. 3 that a specific order 71, 72, 73, 74 of the connection elements can be provided in the connection arrangement 70, but also a predetermined order 91, 92, 93, 94 of the counter connection elements can be provided in the counter connection arrangement 90. The connection elements 71, 72, 73, 74 can be connectable on both sides, for example by using vias. In this case, the counter connection arrangement 90 can be configured as a plug-in connector or the like, so that the order is mechanically predetermined. Thus, due to the "reversing" of the counter connection arrangement 90, the connection is made from the first outer side 35 with a different connection configuration than from the second outer side 36. Since the connection elements 73, 74 are arranged externally, it is functionally irrelevant for the connection of the communication means 41, 42 (i.e. the communication interface 40) whether the connection elements 73, 74 are connected to the counter connection elements 93, 94 in the first mounting position I from the first 35 or in the second mounting position II from the second outer side 36. On the other hand, it can be seen from FIG. 3 that in the second mounting position II, when connecting from the second outer side 36, instead of the first connection element 71 (in the first mounting position I, when connecting from the first outer side 35), the second connection element 72 is connected to the first counter connection element 91, and instead of the second connection element 72 in the first mounting position I, the first connection element 71 is connected to the second counter connection element 92. This enables a mechanical adaptation of the connection configuration and thus also of the actuation of the functional elements 31, 32. Alternatively and/or additionally, an adaptation of the actuation can be carried out electrically by the processing arrangement 80, in particular with a constant assignment of the connection elements to the counter connection elements. Then, for example, depending on the mounting position I, II, the control of the detection function will be carried out either via the first or second counter connection element 91, 92, and the respective other counter connection element 92, 91 will be controlled for the further function.

Furthermore, it is shown in FIGS. 4 and 5 that the counter connection elements 91 to 94, in particular as flat ribbon cables, cross the conductor paths of the communication means 41, 42 at right angles. Thus, a disturbance by at least one of the counter connection elements 91 to 94 on the communication field can at least be reduced. The first and/or second connection element 101, 102 may each also be understood as a short-circuit bridge. The short-circuit bridge 101 and/or 102 may extend at least partially in parallel and/or in phase with the conductive path. Thus, the short-circuit bridge 101 and/or 102 also does not have a disruptive effect, e.g. does not additionally act as a communication means.

FIG. 8 shows a connection arrangement 70 and a counter connection arrangement 90 with further details. The connection arrangement 70 may be attached to the support element 20, and/or the counter connection arrangement 90 may be provided—in particular in the form of a ribbon cable—for connection to the connection arrangement 70. Thereby, the counter connection arrangement 90 may comprise the following:

the first counter connection element 91, which provides a current path for controlling at least one function of the arrangement 10, the at least one second counter connection element 92, wherein two second counter connection elements 92 are shown in FIG. 8 to jointly provide a current path for controlling at least one further function of the arrangement 10, at least the third and fourth counter connection elements 93, 94 to form a circuit with the communication means 41, 42 for controlling the communication function.

Thereby, the counter connection elements 91, 92, 93, 94 may be arranged at least partially spatially parallel and adjacent to each other, and the first counter connection element 91 may be arranged (in particular centrally and/or centered) between the second counter connection elements 92, and the second counter connection elements 92 may be arranged between the third and fourth counter connection elements 93, 94. Moreover, the third and fourth counter connection elements 93, 94 may be arranged externally to the counter connection arrangement 90. Furthermore, the second counter connection elements 92 may be electrically connected to each other via two connection elements 101, 102, wherein the first connection element 101 may be arranged in the region of the connection arrangement 70 and the second connection element 102 may be arranged in the region of the counter connection arrangement 90. In this way, a compensation circuit may be provided to reduce or prevent the communication area in the region of the counter connection arrangement 90. In particular, this area between the first 101 and second 102 of the connection elements can thus not be used for communication. The compensation circuit configured by the paths 92, 101 and 102 thereby compensates (neutralizes) the magnetic fields generated in the region of the third and fourth counter connection elements 93, 94. Preferably, for this purpose, it is provided that the counter connection elements 91, 92, 93, 94 are arranged at an equal distance from one another. Preferably, the counter connection elements 91, 92, 93, 94 are configured as elongated conductors, preferably as lines.

FIG. 9 shows a schematic visualization of a method according to the invention. It can be provided that according to a first method step 501 an mounting of the support element 20 is carried out optionally at least at a first I or second II mounting position, wherein the mounting positions I, II are specific for different sides of the vehicle 1. According to a second method step 502, a connection of a processing arrangement 80 to a connection arrangement 70 on the support element 20 may be performed in order to electrically connect the functional elements 31, 32 to the processing arrangement 80, wherein the connection arrangement 70 provides a connection interface 78 for controlling the functional elements 31, 32. Subsequently, according to a third method step 503, an adjustment of the control of the functional elements 31, 32 for the assignment of the functions according to the selected mounting position I, II may be performed.

With regard to the communication function, it can be alternatively or additionally provided, according to FIG. 9, that according to a further first process step 601 the support element 20 is optionally mounted at least at a first I or second II of the mounting positions, and according to a further second process step 602 a connection of a processing arrangement 80 to a connection arrangement 70 on the support element 20 is carried out in order to electrically connect the communication means 41, 42 to the processing arrangement 80, the connection arrangement 70 providing a connection interface 78 for controlling the communication function.

The foregoing explanation of the embodiments describes the present invention solely in the context of examples. Of course, individual features of the embodiments can be freely combined with each other, provided that this is technically sensible, without leaving the scope of the present invention.

LIST OF REFERENCE SIGNS

1 Vehicle
2 Electronics, door handle electronics
3 Door handle, handle
4 Capacitive sensor
5 Door, flap
6 ID transmitter
7 Interior
10 Arrangement
20 Support element
21 First level
22 Second level
25 Mounting adjustment
31 First functional element
32 Second functional element
33 Surface elements
35 First outside, first side face
36 Second outside, second side face
37 First surrounding
38 Second surrounding
40 Communication means
41 First communication means, NFC antenna or coil
42 Second communication means, NFC antenna or coil
70 Connection arrangement
71 First connection element
72 Second connection element, functionally identical connection elements
73 Third connection element
74 Fourth connection element
78 Connection interface
79 Vias
80 Processing arrangement, part of a supply line
81 Processing unit
90 Counter connection arrangement, part of a supply line
91 First counter connection element
92 Second counter connection element
93 Third counter connection element
94 Fourth counter connection element
101 First connection element, short-circuit bridge
102 Second connecting element, short-circuit bridge
501 First method step
502 Second method step
503 Third method step
504 Further first method step
505 Further second method step 79' Additional vias
21, 22 Layers
31, 32 Functional elements
35, 36 Outer surface
37, 38 Surroundings
41, 42 Communication tools
71, 72 Connection elements, internal connection elements
73, 74 Outside mounting brackets
91, 92 Counter connection elements
x Vehicle longitudinal axis, direction of travel, vehicle longitudinal direction
y Traverse vehicle axle
z Vertical vehicle axis
I First mounting position
II Second mounting position
I, II Mounting positions
L Coil
R Resistance

The invention claimed is:

1. Arrangement for providing at least one communication function for electronics of a vehicle,
exhibiting
a support element adapted to be mounted at mounting positions on different sides of the vehicle to selectively perform the mounting at at least a first or second of the mounting positions,
a first communication means arranged on a first layer of the support element, and
a second communication means arranged at a second layer of the support element,
said communication means being arranged opposite to each other and electrically connected in parallel to create at least one communication area suitable for different selected mounting positions.

2. Arrangement according to claim 1,
wherein
the communication means are each configured to generate a communication field, preferably a magnetic field, in order to generate a communication area in each case, the communication means being arranged geometrically parallel, so that the communication fields extend on both of the layers.

3. Arrangement according to claim 2,
wherein
the communication means are arranged on the respective layers in such a way that the magnetic fields generated by the communication means are symmetrical, in order to generate the communication area on both sides of the support element in the same way for near-field communication.

4. Arrangement according to claim 1,
wherein
the communication means at least partially overlap geometrically or run geometrically parallel or are configured to be congruent in order to generate the communication area on both sides of the support element in each case, so that, another of the communication areas faces away from an interior of the vehicle.

5. Arrangement according to claim 1,
wherein
the communication means are arranged at such a small distance from one another that mutual magnetic coupling, takes place as a result of the magnetic fields generated by the communication means.

6. Arrangement according to claim 1,
wherein
the communication means each form an antenna for near-field communication.

7. Arrangement according to claim 1,
wherein
the communication means are each in the form of at least a conductor path in loop form or a loop antenna or a coil for near-field communication.

8. Arrangement according to claim 1,
wherein
the support element is configured for mounting at the mounting positions on opposite sides of the vehicle, but with the same orientation along a longitudinal direction of the vehicle, the communication means being arranged on both sides of the support element in order to provide the communication area on the opposite sides of the vehicle in a functionally identical manner.

9. Arrangement according to claim 1,
wherein
at least one vias of a connection arrangement is provided on the support element in order to connect the communication means to one another in parallel, and at least one further vias of the communication means is provided in order to additionally connect the communication means to one another electrically.

10. Arrangement according to claim 1,
wherein
a connection arrangement is provided on the support element to provide a connection interface with the communication means, the connection arrangement being configured for bilateral connection to a processing arrangement.

11. Arrangement according to claim 1,
wherein
a connection arrangement is provided on the support element, the connection arrangement having at least two outer connection elements in order to provide a connection interface with the communication means, and having at least two further internal and functionally identical connection elements which are electrically connected directly to one another, via a connection element in order to provide a compensation function for the outer connection elements.

12. Arrangement according to claim 1,
wherein
a connection arrangement is provided on the support element and a counter connection arrangement, is provided for connection to the connection arrangement, the counter connection arrangement having the following:
a first counter connection element to provide a current path for controlling at least one function of the mounting,
at least two second counter connection elements to provide a current path for controlling at least one further function of the arrangement, and
at least a third and fourth counter connection element to form a circuit with the communication means for controlling the communication function,
wherein said counter connection elements are at least partially spatially parallel and adjacent to each other, and said first counter connection element is arranged between said second counter connection elements, and said second counter connection elements are arranged between said third and fourth counter connection elements, said second counter connection elements being electrically connected to each other via at least one connecting element to provide a compensation circuit for reducing or preventing the communication area in the area of the counter connection arrangement.

13. Arrangement according to claim 1,
wherein
a connection arrangement is provided to provide a connection interface with said communication means, said connection arrangement being adapted for bilateral connection to a processing arrangement.

14. Arrangement according to claim 1,
wherein
the support element is configured as a printed circuit board having the at least or exactly two layers, a connection arrangement being arranged on both layers.

15. A method of providing at least one communication function for
electronics of a vehicle, wherein first and second communication means are provided on different layers of a support element, the communication means being arranged opposite each other and electrically connected in parallel to generate at least one communication area suitable for different selected mounting positions on the vehicle, the following steps being provided:
performing a mounting of the support element selectively at least at a first or second of the mounting positions, wherein the mounting positions are specific for different sides of the vehicle, and
connecting a processing arrangement to a connection arrangement on the support element to electrically connect the communication means to the processing arrangement, wherein the connection arrangement provides a connection interface for controlling the communication function.

16. The method according to claim 15,
wherein
the support element with the communication means and the connection arrangement are configured in accordance with an arrangement for providing at least one communication function for electronics of a vehicle, preferably for a door handle electronics of the vehicle, preferably for a communication interface of the vehicle,
exhibiting
a support element adapted to be mounted at mounting positions on different sides of the vehicle to selectively perform the mounting at at least a first or second of the mounting positions,
a first communication means arranged on a first layer of the support element, and
a second communication means arranged at a second layer of the support element,
said communication means being arranged opposite to each other and electrically connected in parallel to create at least one communication area suitable for different selected mounting positions.

* * * * *